United States Patent [19]
Okazaki et al.

[11] 4,020,242
[45] Apr. 26, 1977

[54] PRIMARY-CELLS

[75] Inventors: Ryoji Okazaki, Katano; Kan Aoki; Tomoyuki Shinagawa, both of Hirakata, all of Japan

[73] Assignee: Matsushita Electric Industrial Co., Ltd., Osaka, Japan

[22] Filed: Nov. 25, 1975

[21] Appl. No.: 635,257

[30] Foreign Application Priority Data

Dec. 4, 1974    Japan .................... 49-139715

[52] U.S. Cl. .................... 429/66; 429/162; 429/164; 429/218
[51] Int. Cl.² .................................... H01M 6/00
[58] Field of Search .......... 136/111, 107, 163, 175, 136/179, 181, 3, 110, 13, 14; 429/66, 94, 164, 178, 218, 219, 220, 224, 230, 162, 122

[56] References Cited
UNITED STATES PATENTS

| | | |
|---|---|---|
| 2,877,285 | 3/1959 | Kempf .................... 136/111 |
| 3,042,733 | 7/1962 | Toda et al. .................... 136/110 |
| 3,485,672 | 12/1969 | Ruben .................... 136/146 X |

*Primary Examiner*—Anthony Skapars
*Attorney, Agent, or Firm*—Burgess Ryan and Wayne

[57] ABSTRACT

In a primary-cell of the type in which a cathode or anode increases its apparent volume as the discharge proceeds, thereby absorbing the electrolyte, at least between a cell enclosure which serves as one of the terminals of the primary-cell or top closure and the cathode or anode electrically connected thereto is interposed a spacer which contains electrolyte, is electrically conductive and reduces its apparent volume when the pressure is applied thereto, thereby squeezing the electrolyte out of it.

17 Claims, 7 Drawing Figures

(A)

(B)

(C)

(D)

PRIMARY-CELLS

BACKGROUND OF THE INVENTION

The present invention relates to a primary-cell of the type in which a cathode or anode expands its apparent volume as the discharge proceeds, thereby absorbing therein the electrolyte.

The typical anode and cathode of the above characteristic is a cathode which mainly consists of fluorinated carbon or silver chromate and is used in an organic electrolytic solution, and a zinc anode used in an alkaline electrolytic solution in mercuric oxide cells, alkaline-manganese cells, and silver oxide cells. In these prior art cells, in order to prevent the expansion of a cell enclosure and to keep the electrolyte, between a cathode and anode are interposed not only a separator but also a cotton-fiber spacer which may keep the electrolyte and may reduce its apparent volume when the pressure is applied thereto. The spacer serves as a cushion for absorbing the pressures produced in the primary-cell due to the expansion of the cathode or anode. As the apparent volume of the spacer is reduced, the electrolyte kept or absorbed thereby is squeezed out of it into the cathode or anode. As a result, the electrolyte in the spacer decreases as the discharge proceeds so that the ion conduction between the cathode and anode is adversely affected. In the cells of the type employing an organic electrolyte (consisting of, in general, an electrolyte consisting of a material selected from the group consisting of inorganic salts of light metals and dissolved into an organic solvent) whose conductivity is considerably smaller than that of an aqueous electrolyte, the above drawback is pronounced considerably. As the result, the internal resistance of the primary-cell increases considerably with the decrease in volume of electrolyte in the spacer. Furthermore, the interposition of the spacer between the cathode and anode inevitably results in a longer spacing therebetween so that the internal resistance is further increased. Therefore, the prior art cells have a low capacity, and cannot make full use of the active materials.

SUMMARY OF THE INVENTION

One of the objects of the present invention is therefore to provide a primary-cell with the excellent operating characteristics.

Another object of the present invention is to provide a primary-cell which may positively prevent the expansion of its cell enclosure due to the expansion of the anode or cathode.

A further object is to provide a primary-cell which may eliminate the use of a spacer between the cathode and anode so as to make the spacing therebetween as short as possible, thereby reducing the resistance of an electrolytic layer and hence the internal resistance of the cell to the minimum.

A further object of the present invention is to provide a primary-cell in which the expansion of the anode or cathode may be compensated by the contraction of a spacer so as to minimize the pressures acting upon the cell enclosure to expand it and in which a positive and efficient electro-chemical reaction in the cell may be ensured by the smooth supply of the electrolyte to the cathode by the gradual contraction of the spacer.

A further object of the present invention is to provide a primary-cell in which, instead of the spacer between the cathode and anode in the prior art cell, a spacer made of an electrically conductive material is interposed between the cathode and the cell enclosure and/or between the anode and the top closure. Thus even when the electrolyte in the spacer is squeezed out due to the expansion of the cathode the spacer an increase in resistance between the cathode and anode, that is, the increase in internal resistance of the cell is prevented. Furthermore, the expansion of the cathode causes a more positive contact of the spacer with the cell or top enclosure, thereby providing excellent electrical contact therebetween and consequently reducing the internal resistance of the cell.

To the above and other ends, the present invention provides a primary-cell wherein a cell element assembly consisting of a cathode, anode and separator interposed between the cathode and anode is enclosed in a primary-cell enclosure which serves as one of the terminals of the primary-cell and which is sealed by and electrically insulated from a metal top closure which serves as the other terminal; and at least between said cathode or anode and said cell enclosure or top closure electrically connected to said cathode or anode is interposed a spacer which is chemically stable in said primary-cell, electrically conductive and capable of holding the electrolyte and is adapted to reduce its apparent volume when the pressure is applied thereto.

BRIEF DESCRIPTION OF THE DFRAWING

Same reference numerals are used to designate similar parts throughout the figures.

DESCRIPTION OF THE PREFERRED EMBODIMENTS

Figure 1:
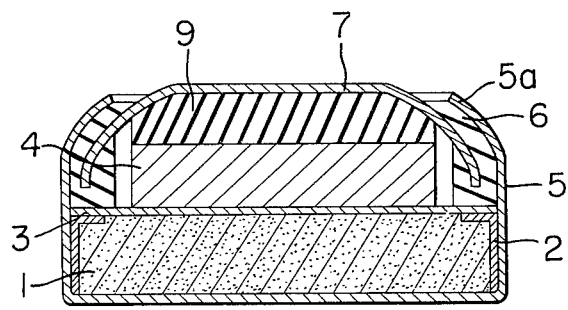
FIGS. 1 and 2 are schematic sectional views of a first and a second embodiments, respectively, of the button- or flat-type cell in accordance with the present invention.

First Embodiment, FIG. 1

Referring to FIG. 1, reference numeral 1 denotes a disk-shaped cathode mainly consisting of fluorinated carbon (90% by weight) mixed with carbon powder as a bonding agent; 2, a stainless steel cathode ring surrounding the side wall of and peripheral portion of the upper surface of the cathode 1; 3, a separator made of non-woven fabric of polypropylene for covering the top of the cathode 1; 4, an anode made of metallic lithium and placed above the cathode 1; 9, a spacer made of an electrically conductive material and placed upon the anode 4, the spacer being made of a porous nickel sheet with the porosity of 90% and with the pore diameter of 100 $\mu$; 5, a stainless steel enclosure which serves as a cathode terminal; 6, a polypropylene sealing and insulating gasket interposed between a metal top closure 7 placed over the spacer 9 and the top of the enclosure 5, the top end portion 5a of the enclosure 5 being bent inwardly toward the metal top closure 7 to seal the cell.

The spacer 9, the cathode 1 and the separator 3 are impregnated with a suitable amount of electrolyte consisting of lithium perchloric acid dissolved into propylene carbonate at the ratio of 1 mol/l. The electrolyte may consist of a nonaqueous solvent such as dimethoxyethane, dioxolane, aceto nitrile tetrahydrofuran, dimethylsulfoxide, ethylenecarbonate, $\alpha$-butyrolactone or the mixture thereof and a solute consisting of salt of light metal such as sodium perchlorate, aluminum chloride, lithium borofluoride.

Figure 2:
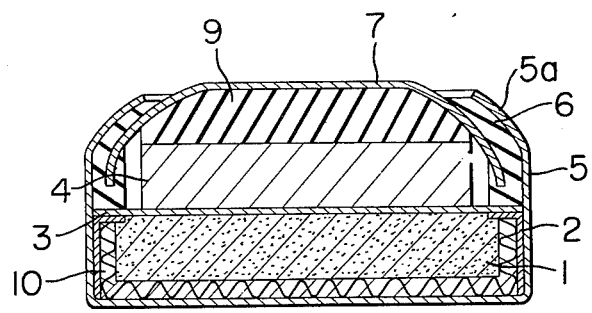

Second Embodiment, FIG. 2

The second embodiment shown in FIG. 2 is substantially similar in construction to the first embodiment shown in FIG. 1 except that a cup-shaped spacer 10 made of carbon fiber non-woven fabric is interposed between the cathode 1 and the enclosure 5 and the spacer 2.

The spacers used in the present invention may be made of a sponge-like porous metal such as stainless steel, nickel, titanium, copper, aluminum, iron, silver or alloy thereof. In addition, they may be provided by forming a woven-or non-woven-fabric made of carbon, metal fibers or the mixture thereof into a suitable shape. The sponge-like metals may be provided by sintering of metal powder. In the present invention, it is preferable to use the sponge-like metals with the interconnecting channels or pores throughout the metals. The pore diameter is selected depending upon the construction of the cells and the viscosity of the electrolytes used, but in general the pore diameter is preferably less than 500 $\mu$. The porosity is closely correlated with the electrolyte holding capacity and the resistance to the deformations by compression, and it is preferable that the materials have as high porosity as possible as far as the high porosity will not adversely affect the machinability and handling. In general, materials with a porosity of 80 to 95% still have a satisfactory machinability.

It is, of course, important that the spacers used in the cells in accordance with the present invention must be chemically stable. Therefore, the suitable material for spacers must be selected depending upon the electrolyte and other chemical compounds used. For instance, the spacer which is made into contact with the zinc-amalgamated anode in an alakaline solution may be made of a metal such as copper which is easily susceptible to nitrification so that the self-consumption of zinc may be prevented. The spacer which is made into contact with the cathode made of silver oxide, marcuric oxide or manganese dioxide and used with the zinc anode may be preferably made of nickel. In the cells in which an anode active agent such as metallic lithium and a cathode active agent such as fluorinated carbon, silver chromate, manganese dioxide, vanadium pentaoxide, or cupric oxide are added to an electrolyte solution consisting of an organic, nonaqueous solution and a solute consisting of inorganic salt of light metal, the spacer may be made of nickel, copper, iron or alloy thereof such as stainless steel. In addition, the spacers which are made into contact with the cathodes may be made of stable materials such as aluminum, titanium, silver or alloy thereof. In both cases, carbon may be used. In addition to the above examples, any suitable materials may be used to make the spacers without departing the scope of the present invention.

Figure 3:
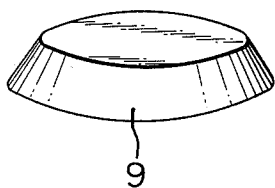
FIG. 3 shows spacers used in the present invention.
Figure 3:
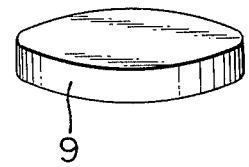
Figure 3:
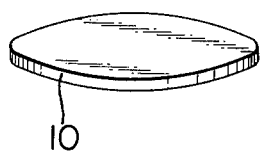
Figure 3:
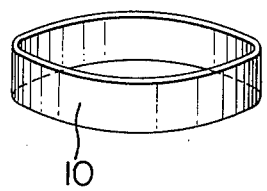

The shapes of the spacers may be suitably selected depending upon the constructions of the cells. For instance, the spacers shown in FIGS. 3-A and -B may be used as the spacer 9 which is made into contact with the anode 4 while the spacers of the types shown in FIGS. 3-C and -D may be used as the spacer 10 in contact with the cathode 1. Since these spacers are electrically conductive, the current flows therethrough when they are made into contact with the metal top closure 7 and the cell enclosure 5. The more reliable electrical and mechanical contact between the spacers and the top closure 7 and the cell enclosure 5 may be attained when they are joined by the spot welding or the like at the centers thereof. The spacer 10 is, of course, impregnated with the electrolyte.

Figure 4:
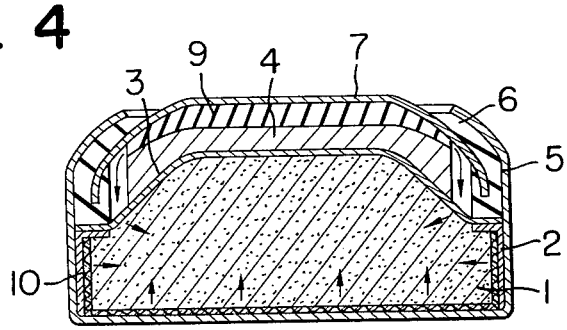
FIG. 4 is a view similar to FIG. 2 illustrating the condition of the primary-cell after some discharge time interval.

FIG. 4 is a cross sectional view of the primary-cell shown in FIG. 2 after it has been discharged for some time. It is clearly seen that the cathode 1 mainly consisting of fluorinated carbon has been considerably expanded upwardly because the lataral expansion is restricted by the stainless steel ring 2 while the lithium anode 4 has been consumed and reduced in volume. The expansion of the cathode 1 is caused by the fixation or adhesion of the discharge product LiF to the cathode 1 and by the absorption of the electrolyte by the cathode 1 which is promoted as the discharge proceeds. The expansion of the cathode 1 is considerably greater as compared with the contraction of the anode 4 so that the compressive forces are exerted to the spacers 9 and 10 thereby reducing their apparent volumes. However, the reduction in volume of the spacers 9 and 10 are cancelled by the increase in volume of the electrodes (that is, the cathode 1 and the anode 4) so that neither the cell enclosure 5 and the top closure 7 are subjected to the excessive forces. Thus, the expansion of the primary-cell may be prevented. Because of the reduction in apparent volume of the spacers 9 and 10, the electrolyte is squeezed out of them in the directions indicated by the arrows in FIG. 4 and absorbed by the cathode 1. Therefore, the electrolyte may be supplemented so that the discharge may be continued. Same is true for the primary-cell shown in FIG. 1. Thus, the construction shown in FIG. 2 is adapted for a relatively higher discharge rate while the construction shown in FIG. 1 is adapted for a discharge of a relatively smaller rate because the smoother supply of the electrolyte may be ensured in the primary-cell shown in FIG. 2 than in the primary-cell shown in FIG. 1.

In the prior art primary-cell in which in addition to a separator, a spacer made of electrically insulating cotton fibers is interposed between the cathode and anode, the spacer is contracted so that the electrolyte may be supplied to the cathode as the cathode is expanded while the spacer is contracted as the discharge proceeds. However, since the spacer is made of an electrically non-conductive material, when the electrolye is almost completely squeezed out of the spacer, the spacer becomes an insulator so that the discharge is adversely affected.

Figure 5:
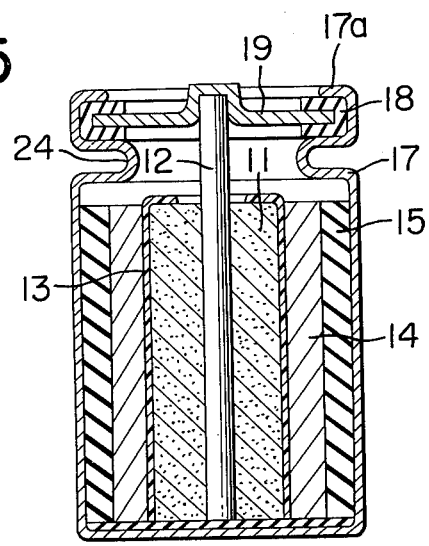
FIGS. 5 and 6 are schematic sectional view of a third and a fourth embodiments, respectively, of a cylindrical cell in accordance with the present invention.

Third Embodiment, FIG. 5

In the third embodiment shown in FIG. 5, the present invention is applied to a cyclindrical cell in which a cathode is placed at the center while an anode is placed around the cathode with a separator interposed therebetween. That is, a carbon rod 12 is inserted at the center of a cylindrical depolarizing core 11 which is surrounded by a separator 13 made of polypropylene non-woven fabric. A metallic lithium anode 14 in the form of a hollow cylinder is fitted over the separator 13, and is surrounded by a spacer 15 made of sponge-like nickel sheet. These components are enclosed in a cell enclosure 17 with an insulating sheet 16 made of polyethylene interposed between the bottom of the enclosure 17 and the bottoms of these components. A top closure 9 which serves as an anode terminal and which is made integral with a sealing and insulating gasket 18 made of polypropylene is placed in a flange portion 24 formed at the top of the cell enclosure 17, and the top peripheral portion 17a of the cell enclosure 17 is bent inwardly over the top enclosure 19, thereby retaining it securely in position. The depolarizing core 11, the spacer 15 and the separator 13 are impregnated with the electrolyte of the type described above with reference to the first embodiment.

Figure 6:
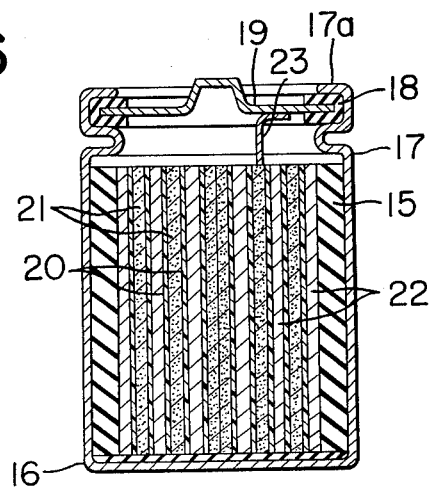

Fourth Embodiment, FIG. 6

The fourth embodiment shown in FIG. 6 is substantially similar in construction to the third embodiment described above in conjunction with FIG. 5 exception of the arrangement of cathodes 21, separators 20 and anodes 22 which constitute an electrode assembly. That is, the cathodes 21, the separators 20 and the anodes 22 are each, with the exception of one electrode at the center in the form of hollow cylinders except one placed at the center and disposed coaxially and spaced apart by a suitable distance from each other in the radial direction in the order, from the outside, of the anode 22, the separator 20, the cathode 21, the separator 20, the anode 22, the separator 20, the cathode 21, and so on. The separators 20 are made of polypropylene non-woven fabric; the cathodes 21 are made of a net-shaped aluminum current collector applied with the depolarizer; and the anodes are made of a metallic lithium sheet, and the cathodes, 21, separators 20 and anodes 22 are impregnated with the electrolyte. Within the cell closure 17, the cathodes 21 are electrically connected to the inner surface of the top closure 19 through a lead wire 23 which may be joined to them by electric welding. In the instant embodiment, the spacer 20 is placed on the side of the cathode, but it is to be understood that the spacer may be placed on the side of the anode.

The present invention may be also applied to the primary-cell of the type in which the cathodes and anodes are alternately arrayed with the spacers interposed therebetween. The spacer is also placed between the outermost cathode or anode and the inner wall of the cell enclosure. Since the effects and advantages of the third and fourth embodiments are readily understood from the description of the first and second embodiments with reference to FIGS. 1 and 2, no further description shall be made in this specification.

So far the present invention has been described in conjunction with the fluorinated carbon-lithium primary-cell, but it is to be understood that the present invention may be also applied to the primary-cells of other types. For instance, in the silver-chromate-lithium, manganese-dioxide-lithium, cupric oxide-lithium primary-cell in which the cathode is expanded as the result of the discharge, silver chromate or manganese dioxide may be used instead of fluorinated carbon which is used in the above embodiments. In the alkali-manganese primary-cell such as manganese-dioxide-zinc cell or in the alkaline primary-cell such as mercuric-oxide-zinc or silver-oxide-zinc cell in which the discharge results in the expansion of the anode such as zinc, the present invention may be also utilized by selecting a suitable material for spacers, and determining suitable configurations and positions of spacers depending upon the cell construction. Thus the present invention may be applied to every primary-cell in which the sum of the apparent volumes of the amode and cathode increased as the discharge proceeds.

Figure 7:
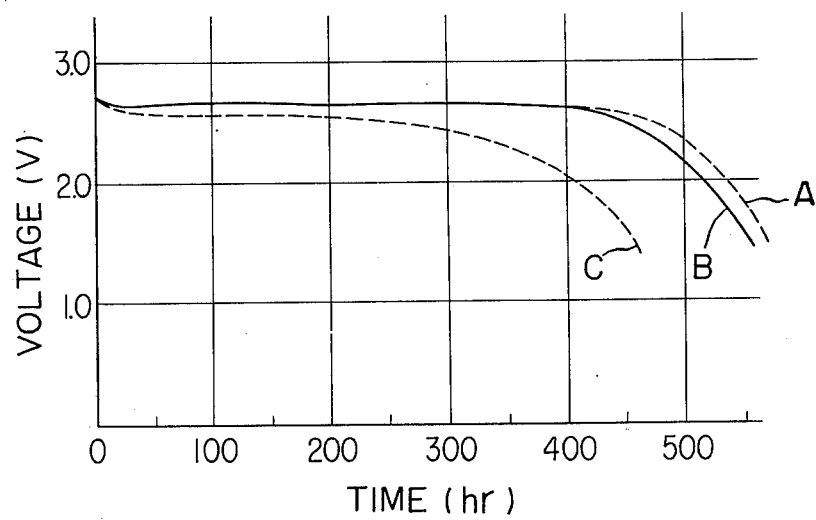
FIG. 7 is a graph illustrating the operating characteristics of the examples of the present invention and an example of the prior art cell.

Examples, FIG. 7

Next in order to more specifically and distinctly point out the novel patentable features of the primary-cells in accordance with the present invention, two examples (A) and (B) will be described in conjunction with a prior art primary-cell for the sake of comparison purposes. The primary-cells used in the experiments were of the button type or flat type with the diameter of 12 mm and the height of 5 mm.

Example (A): the second embpodiment, shown in FIG. 2;

Example (B): the first embodiment shown in FIG. 1; and

Prior art (C): of the type in which both the separator and cotton fiber spacer are interposed between the cathode and anode. FIG. 7 shows the operating characteristics of (A), (B) and (C) on 10 K-ohm load at +20° C. It is readily seen that the examples (A) and (B) of the present invention are superior in both discharge voltage and capacity to the prior art (C). The internal impedances measured with 1 KHz alternating current are shown in Table below:

|     | internal impedance in ohm, fresh cell | internal impedance in ohm after 300 hours |
| --- | --- | --- |
| (A) | 110 | 120 |
| (B) | 115 | 125 |
| (C) | 135 | 500 |

It is seen that even the fresh prior art cell had a high internal impedance because the resistance of the electrolyte layer is increased due to the increase in distance between the cathode and anode between which is inserted the electrolyte impregnated spacer. As a result, the discharge voltage of the prior art cell (C) drops immediately after the discharge is started as shown in FIG. 7. As the discharge proceeds, the internal impedance of (C) also increases considerably. It is seen from the above Table that the internal impedance of the prior art cell (C) after 300 hours is several times as high as those of the examples (A) and (B). As described above, in the prior art cell (C), the spacer made of a non-conductive material is interposed between the cathode and anode, and as the electrolyte is squeezed out of it, the resistance between the cathode and anode increased, thus resulting in the voltage drop as the discharge proceeds. Furthermore, the capacity of the prior art cell (C) is considerably smaller than those of the examples (A) and (B). On the other hand, the examples (A) and (B) exhibit the very stable operating characteristics over a long discharge time interval. Thus, the novel and excellent features of the present invention over the prior art primary-cells are very apparent. From FIG. 7 and Table, it is seen that the example (A) has better operating characteristic than the example (B) because, as described above, a smoother supply of the electrolyte to the cathode is ensured in the example (A) or the second embodiment than in the example (B) or first embodiment shown in FIG. 1.

What is claimed is:

1. A primary-cell wherein a cell element assembly comprising a cathode electrode, anode electrode and separator interposed between said cathode and anode is surrounded by a hermetically sealed jacket comprising a primary-cell enclosure member and a top closure member sealing said enclosure and electrically insulated therefrom, said top closure serving as one of the terminals of the primary-cell, and said cell enclosure serving as the other terminal; and a spacer between one of said electrodes and said jacket member electrically connected to said at least one of said electrodes, said spacer being chemically stable in said primary-cell, electrically conductive, and capable of holding the electrolyte and is adapted to reduce its apparent volume when pressure is applied thereto.

2. A primary-cell as set forth in claim 1 wherein at least one of said electrodes is adapted to increase its apparent volume as the primary cell dishcarges, thereby absorbing therein the electrolyte.

3. A primary-cell as set forth in claim 1 wherein said spacer is made of a sponge-like material selected from the group consisting of nickel, titanium, copper, aluminum, iron, silvers and alloys thereof.

4. A primary-cell as set forth in claim 1 wherein aid spacer is a fabric being made of fibers selected from the group consisting of carbon fibers, metallic fibers or mixture thereof.

5. A primary-cell as set forth in claim 1 wherein said spacer and said at least one of said jacket members are joined together by welding.

6. A primary-cell as set forth in claim 1 wherein said spacer also is interposed between said top closure and said electrode electrically made into contact with said top closure.

7. A primary-cell as set forth in claim 1 wherein said spacer is interposed between said cell enclosure and said electrode electrically connected thereto.

8. A primary-cell as set forth in claim 1 wherein said spacer is interposed both between said top closure and the electrode electrically connected to said top closure, and a further spacer is interposed the other of said electrodes and said cell enclosure electrically connected to said other of said electrodes.

9. A primary-cell as set forth in claim 3 wherein said sponge-like material consists of a sintered body of metallic powder with interconnecting pores throughout the body.

10. A primary-cell as set forth in claim 9 wherein said sintered metallic powder body has a pore diameter less than 500 microns.

11. A primary-cell as set forth in claim 9 wherein said sintered metallic powder body has a porosity between 80 and 95%.

12. A primary-cell wherein a cathode made of a material selected from the group consisting of mercuric oxide, silver oxide and manganese dioxide, an anode made of zinc amalgamated, a separator interposed between said cathode and anode and an alkaline electrolyte are enclosed within a hermetically sealed jacket comprising a cell enclosure member serving as one of the terminals of the dry cell and a top closure member sealing said enclosure and electrically insulated member which serves as the other terminal; and a spacer beween at least one of said electrodes and one member of said jacket and electrically connected thereto, said spacer being chemically stable within the primary-cell, electrically conductive and capable of holding therein the electrolyte and reducing its apparent volume when pressure is applied thereto.

13. A primary-cell as set forth in claim 12 wherein said spacer is interposed between the cathode and said at least one member of said jacket electrically connected thereto, and is made of a metal selected from the group consisting of nickel, stainless steel and carbon.

14. A primary-cell as set forth in claim 12 wherein said spacer is made of copper and is interposed between said anode and said at least one member of said jacket electrically connected thereto.

15. A primary-cell wherein a cathode electrode made of a material selected from the group consisting of carbon fluoride, silver chromate, manganese dioxide, cuprice oxide and vanadium pentoxide, an anode electrode made of metallic lithium, a separator interposed between said cathode and anode electrodes, and an electrolytic solution consisting of an electrolyte dissolved into non-aqueous solution are enclosed within a hermetically sealed jacket comprising a primary-cell enclosure member which serves as one of the terminals of the primary-cell and a top closure member sealing said enclosure and electrically insulated therefrom, said top closure serving as the other terminal; and a spacer between at least one of said electrodes and said jacket member electrically connected thereto said spacer being chemically stable in the primary-cell, electrically conductive and capable of holding therein the electrolyte solution and reducing its apparent volume when the pressure is applied thereto.

16. A primary-cell as set forth in claim 15 wherein said spacer is made of a material selected from the group consisting of aluminum, titanium, silver and alloys thereof, carbon and stainless steel, and is interposed between said cathode and said jacket member electrically connected thereto.

17. A primary-cell as set forth in claim 15 wherein said spacer is made of a material selected from the group consisting of nickel, copper, iron, alloys thereof and carbon, and is interposed between said anode and said jacket member electrically connected thereto.

* * * * *

UNITED STATES PATENT OFFICE
CERTIFICATE OF CORRECTION

Patent No. 4,020,242            Dated April 26, 1977

Inventor(s) Ryoji Okazaki, et al

It is certified that error appears in the above-identified patent and that said Letters Patent are hereby corrected as shown below:

Column 4, line 64:    "cyclindrical" should be --cylindrical--.

Column 5, line 23:    --with the-- should be inserted after "FIG. 5".

line 29:    "except one placed at the center and" should be deleted.

Column 7, line 22:    "dishcarges" should be --discharges--.

line 28:    "aid" should be --said--.

Signed and Sealed this

Eighth Day of November 197

[SEAL]

Attest:

RUTH C. MASON          LUTRELLE F. PARKER
*Attesting Officer*        *Acting Commissioner of Patents and Trademark*